Sept. 16, 1930.   J. W. PRICE   1,775,693
FISH SCALING MACHINE
Filed Dec. 31, 1928   2 Sheets-Sheet 1

INVENTOR.
James W. Price.
BY
Lloyd W. Patch
ATTORNEY.

Sept. 16, 1930.     J. W. PRICE     1,775,693
FISH SCALING MACHINE
Filed Dec. 31, 1928     2 Sheets-Sheet 2
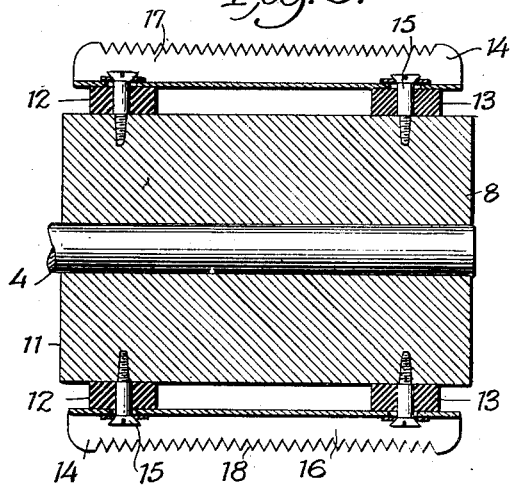
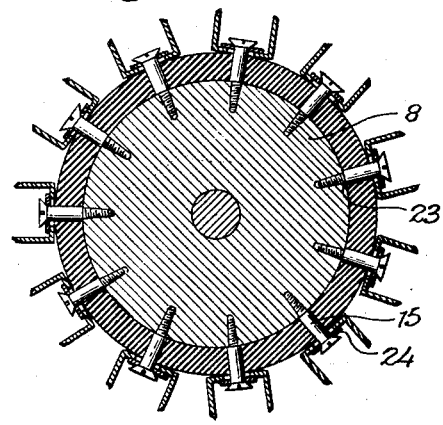
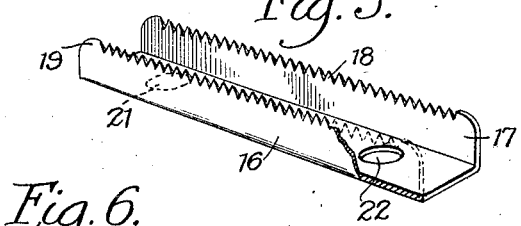
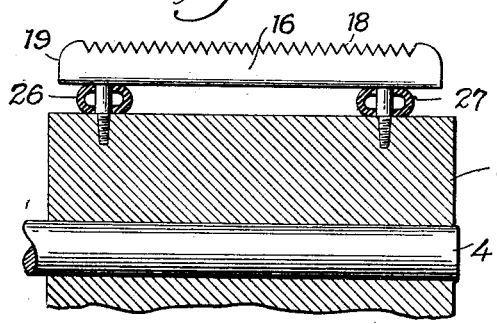
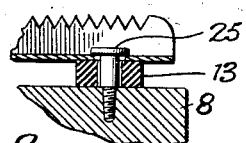
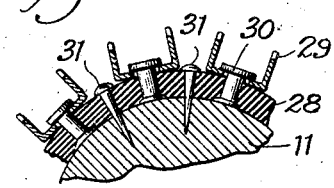
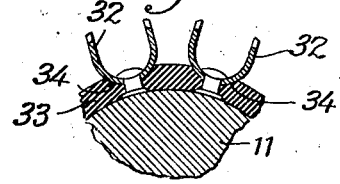
INVENTOR.
James W. Price,
BY Lloyd W. Patek
ATTORNEY.

Patented Sept. 16, 1930

1,775,693

UNITED STATES PATENT OFFICE

JAMES W. PRICE, OF BLOOMINGTON, INDIANA

FISH-SCALING MACHINE

Application filed December 31, 1928. Serial No. 329,654.

This invention relates to fish scaling machines and has to do particularly with a simple, compact machine of this type adapted for market, hotel, home, and like uses where it is desired to quickly and thoroughly remove the scales from fish.

The primary object of my present invention is to provide a machine which will remove the scales from the fish without tearing the skin, breaking or bruising the flesh or otherwise injuring the fish, and which can be used to clean the scales from all portions of the fish.

Another object is to provide a machine which is inexpensive to manufacture, is of compact form to thus require a very small space for installation, and is of substantial construction thus insuring efficient operation with a minimum requirement for mechanical attention and repair.

Still another object resides in providing scale removing members which exert a scraping force to loosen and remove the scales, and which are mounted to yield sufficiently to obviate the danger of tearing the skin or breaking the meat of the fish or injuring the hand of the operator if the hand should be accidentally brought against the scaling head.

With the above and other objects in view, which will be apparent to those skilled in the art, my present invention includes certain novel features of construction and combinations of parts which will be now more particularly set forth in connection with the drawings.

In the drawings:

Figure 1 is a view in side elevation showing a machine constructed in accordance with my invention.

Fig. 2 is a view in front elevation.

Fig. 3 is a longitudinal sectional view through the scaling head.

Fig. 4 is a transverse sectional view through the scaling head.

Figure 1:
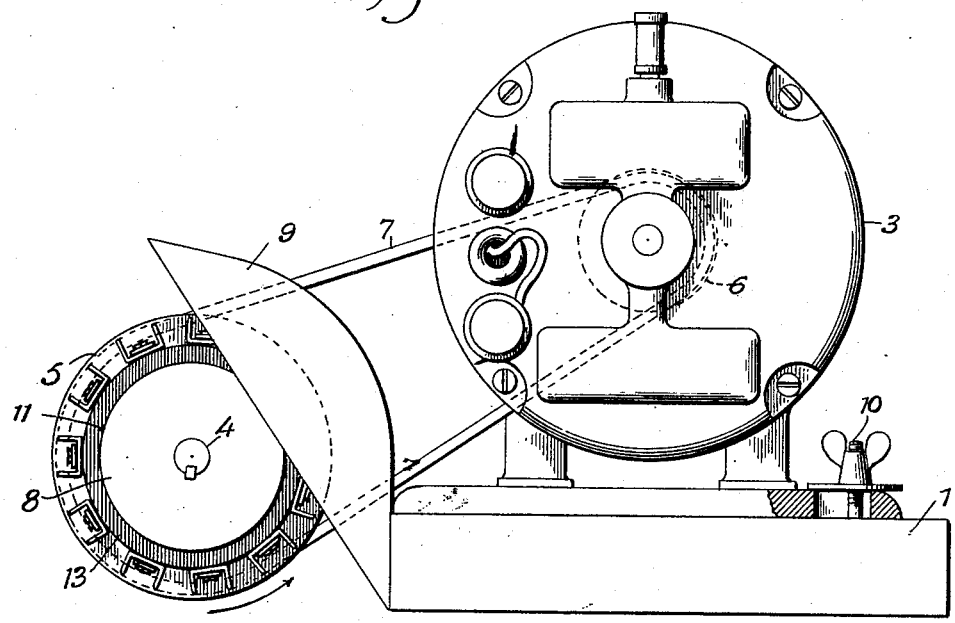
Figure 2:
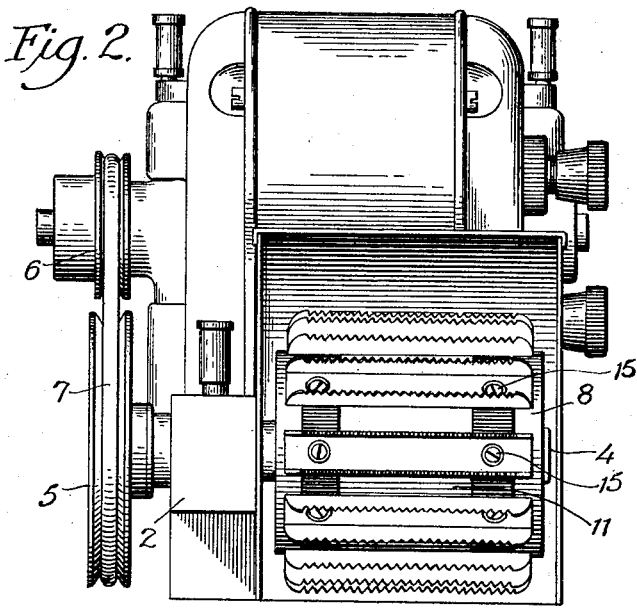

Fig. 5 is a perspective view showing one of the scaling bars.

Fig. 6 is a fragmentary view similar to Fig. 3 illustrating a modified construction.

Fig. 7 is a similar fragmentary view showing another modified form.

Figs. 8 and 9 are fragmentary transverse sectional views through the scaling head to show still other modifications.

The base 1 which can be of any desired form and type has a bearing 2 carried at one side and at one end thereof, and the electric motor 3, or other power unit is mounted on this supporting base.

A shaft 4 is journalled in the bearing 2 and has a belt wheel 5 thereon in line with the belt wheel 6 on the motor shaft so that this shaft 4 is driven through the medium of the belt 7 fitted upon the belt wheels 5 and 6.

The scaling head generally indicated at 8 is fixed on the shaft 4 to be revolved thereby in the direction indicated by the arrow in Fig. 1, and a shield 9 is carried by the supporting base 1 to guard against scales being thrown upon the motor 3 and otherwise scattered. If desired a shield or guard might be placed to cover the belt wheels 5 and 6 and the belt 7, and it will be appreciated that sprocket wheels and a sprocket chain or gearing might be substituted for this belt drive and that other mechanical variations and refinements can be resorted to in the construction of these parts. Where a belt is used it is perhaps desirable that the motor 3 be mounted for adjustment and a clamp bolt 10 is provided to hold the adjustment.

The scaling head 8 consists of a cylindrical body or drum 11 which has the annular cushion bands 12 and 13 mounted preferably adjacent its ends and carries a plurality of scaling bars 14 supported by the cushion bands and held in place by screws 15 or other suitable fastenings. As shown in Fig. 5, the scaling bars are of elongated form and are substantially U-shaped in cross section, the side flanges 16 and 17 being notched or serrated to form a plurality of teeth or points 18.

The teeth or bands 18 are stopped short of each end of the flanges 16 and 17 and the solid portions at the ends are rounded over as at 19 to positively prevent the presentation of any sharp points or teeth which would tend to tear or cut the skin of the fish. I have found that the scaling bars are expeditiously and cheaply formed by stamping the same from sheet steel or other suitable material and bending the same to the desired U-shape form. The stamping operation is preferably accomplished so that the die strikes the metal from the outer side and in this way the teeth or points 18 are slightly rounded over on their outer edges. Openings 21 and 22 are provided through the scaling bars 14 and the screws or other fastenings 15 pass through these openings.

It is preferable that the cushion bands 12 and 13 be made of sponge rubber or other material which will yield under slight pressure, but which at the same time is sufficiently resilient to hold the scaling bars in the proper position. As the scaling bars must have a more or less yielding mounting, it is essential that the openings 21 and 22 be of greater size than the diameter of the screws or fastenings 15, and it is preferable that the screws be provided with shoulders as indicated at 23 to insure against the same being drawn too tightly against the scaling bars. Washers 24 can be used to keep the heads of the screws from passing through the openings 21 and 22, or the screws might be made with bolt more or less flat heads 25, as shown in Fig. 7.

In the modified construction shown in Fig. 6 I have illustrated cushion bands 26 and 27 adjacent the ends of the cylindrical body which are made of tubular material, preferably live rubber or the like, and it will be appreciated that these cushion bands will compress sufficiently to give the desired yielding pressure upon the several scaling bars.

With the modified construction illustrated in Fig. 8 the cushion band 28 has the scaling bars 29 secured directly thereto by means of rivets 30, or other suitable fastenings, and the band 28 carrying the bars 29 is secured upon the cylindrical body by means of nails 31 or other fastenings passing through the band in the spaces between the bars. In this way the fastenings can be driven in to clamp the cushion band securely in place and the natural resiliency and flexibility of the band is sufficient to permit the necessary yielding movement of the respective scaling bars.

As illustrated in Fig. 9, the scaling bars 32 are substantially semi-circular in cross section and these can be mounted in place by being secured to the cushion band 33 after the manner shown in Fig. 8 or by the use of screws or other fastenings as illustrated in Figs. 3, 4 and 6. It may be found necessary or advantageous to notch the cushion band 33 as at 34 to receive the respective scaling bars so that they will be held in proper relation, however as the scaling bars rest directly against the cushion band the desired yielding mounting will be accomplished. In the use of my improved structure the current to the motor 3 is turned on and the scaling head 8 is revolved in the direction indicated by the arrow in Fig. 1 preferably at a speed around 700 R. P. M. As this speed is attained the respective scaling bars will be held out against the heads of the screws or fastenings 15 by centrifugal force, and as a fish is placed against the toothed surface presented by the several scaling bars, these roughened edges will loosen the scales and will flip the same from the body of the fish. The fish will be held to contact with the scaling head at substantially the location of the arrow in Fig. 1, with the head toward the supporting base 1, and as the scales are removed from the fish, they will fall beneath the shield 9. Due to the fact that the various bars are held out by centrifugal force and have a yielding mounting on the scaling head, the entire structure will yield to prevent tearing of the skin or breaking or bruising of the meat of the fish, and the rounded ends of the scaling bars will positively prevent cutting or tearing of the fish. The scales will be thrown from the scaling head by centrifugal force and the structure will thus be kept comparatively clean at all times. In case one of the scaling bars should become bent or otherwise require replacement, it is only necessary to remove this particular bar and replace the same, or where the parts are constructed as shown in Figs. 8 and 9, a new set of cushion bands carrying several scaling bars can be readily fitted in place. An entire new scaling head can be expeditiously fitted to the shaft where this is desired or required, and all parts of the structure are of simple and durable form, so that they will not be likely to be broken or otherwise damaged, and in any event any repair or replacement will not ordinarily require the services of a specially skilled mechanic.

While I have in each instance shown the scaling bars as extending substantially parallel with the axis of rotation of the scaling head, these might be mounted to substantially follow the line of a spiral taken on a short pinch around the central axis, and further it will be appreciated that other changes, modifications and variations can be resorted to in the form, construction, arrangement and mounting of the parts without departing from the spirit and scope of my invention.

I claim:

1. A fish scaling machine comprising a revolubly mounted substantially cylindrical scaling head having a plurality of substantially unyielding toothed scaling bars mounted thereon to yield bodily radially upon said scaling head.

2. A fish scaling machine comprising a substantially cylindrical revolubly mounted scaling head having a plurality of toothed scaling bars around the periphery thereof, and yielding cushion means interposed between said scaling bars and the periphery of said head to urge the scaling bars into yielding contact with the fish to be scaled and to allow said bars to yield radially.

3. A fish scaling machine comprising a revolubly mounted shaft, a substantially cylindrical body carried by said shaft, cushion members carried peripherally on said body, and a plurality of toothed scaling bars mounted on the cushion members to be yieldably carried by said body.

4. A fish scaling machine comprising a revoluble substantially cylindrical body, a plurality of scaling bars movably mounted peripherally on said body, said scaling bars being substantially U-shaped in cross section with the side flanges disposed outwardly and said side flanges being toothed in their middle portions and being rounded over at their ends, and cushion means interposed between said bars and the head whereby said bars are mounted to yield radially with respect to the head.

5. A fish scaling machine comprising a revolubly mounted substantially cylindrical body, a plurality of substantially U-shaped scaling bars, and means to mount the scaling bars yieldably in a radial direction on the cylindrical body with the side flanges thereof disposed outwardly, said side flanges at their edges being toothed in the middle portions and being rounded over at their ends.

6. A fish scaling machine comprising a supporting structure, a shaft revolubly mounted on said supporting structure, means to revolve the shaft, a substantially cylindrical body portion carried by the shaft, cushion rings adjacent the ends of the cylindrical body, a plurality of scaling bars substantially U-shaped in cross section having the side flanges of the U-shape form notched in their middle portions and rounded over at their ends, and means to mount said scaling bars upon the cylindrical body to be yieldable against the cushioning means.

In testimony whereof I hereunto affix my signature.

JAMES W. PRICE.